3,471,463
POLYMERIZATION OF ETHYLENE BY MEANS OF RADICAL INITIATION USING CARBON DIOXIDE AS REACTION MEDIUM

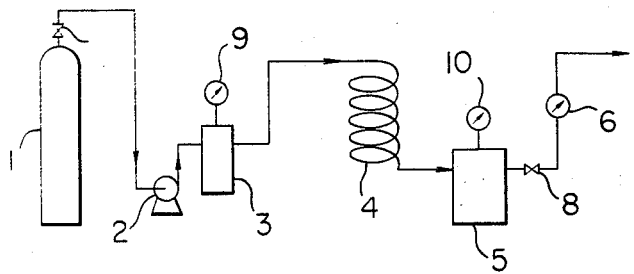

Tsutomu Kagiya, Kyoto-shi, Sueo Machi and Miyuki Hagiwara, Takasaki-shi, and Seiichi Kise, Ichihara-shi, Japan, assignors to Japan Atomic Energy Research Institute, Minato-ku, Tokyo, Japan
Filed Mar. 3, 1967, Ser. No. 620,487
Claims priority, application Japan, Apr. 22, 1966, 41/25,219, Patent 42/4,972
Int. Cl. C08f *1/11, 1/60, 1/78*
U.S. Cl. 260—94.9               7 Claims

ABSTRACT OF THE DISCLOSURE

The present disclosure is directed to use of carbon dioxide as the reaction medium in polymerization of ethylene in the presence of a radical initiating compound as the reaction promoter; and in particular, a method to carry out the above-mentioned polymerization continuously by means of a tubular reactor.

BACKGROUND OF THE INVENTION

In the prior art, polymerization of ethylene using a radical initiating compound is carried out at a high pressure of 1000 to 2000 atms., and at a high temperature of 150–250° C. and the reaction product is taken out of the reaction vessel in molten state. The molecular weight and density of the polyethylene thus produced is rather low, and the product is of highly branched molecular structure. Further, as solvent, a saturated hydrocarbon such as n-heptane, n-hexane, cyclohexane, is used, and therefore, complicated steps are required for separation and recovery of the solvent used.

Recently, radical initiating compounds are effective at low temperature have been developed, and it is now possible to produce highly crystalline polyethylene of high molecular weight and of higher density at lower temperatures. However, when polymerization is carried out at lower temperatures, polyethylene is produced in the solid state, and in the absence of the solvent, such solid polyethylene sticks to the inner walls of the reaction vessel and pipe lines, and accumulates and clogs pipes and thus impedes continuous operation of the polymerization reaction. This is especially true when a tubular reactor, which has the advantage of obtaining a polymerized product with a narrow range of molecular weight distribution by a uniform reaction, is used; in such case, clogging is a serious problem. This problem may be solved by selecting a suitable reaction medium or solvent. The medium suitable for such purpose should have the following characteristics:

(1) it must be stable toward the initiating compound used and not provoke any undesirable side reactions;
(2) it must be easily separated from the produced polyethylene;
(3) it must not impede polymerization of ethylene; and
(4) it must be available in high purity and at low cost.

We, noting that carbon dioxide is chemically very stable, is easily liquefied at critical temperature 31° C., and, further, is available in high purity at low cost, experimented with this substance as a polymerization medium, using a transparent reaction vessel. We learned that monomeric ethylene is homogeneously miscible with liquefied carbon dioxide and polyethylene is produced in powder form, which is not dissolved in the medium, but flows freely in the liquefied ethylene-carbon dioxide mixture in dispersed partly-swollen state. Further it was observed that carbon dioxide has no deleterious effect on the polymerization of ethylene, and the polymer produced in carbon dioxide at a temperature lower than the melting temperature of the polymer does not stick to the inner walls of the reaction vessel. Having confirmed the utility of carbon dioxide as a reaction medium, we devised method and apparatus for continuous operation, as explained later. And studies revealed that polyethylene formed by this method does not clog a pipe of which the inner diameter is no more than 3 mm. and which is as long as 10 m.

SUMMARY OF THE INVENTION

This invention relates to a process for polymerizing ethylene in carbon dioxide as the reaction medium by means of a radical initiating compound as the reaction promotor at a temperature lower than the melting temperature of the polyethylene to be produced, and especially a process in which a mixture of monomeric ethylene and liquefied carbon dioxide, to which a small amount of the initiator is continuously fed, is passed through a tubular reactor and the polyethylene formed in powder state is continuously recovered.

Therefore, it is an object of this invention to provide a novel process for polymerizing ethylene which produces polyethylene in powder form at a temperature lower than the melting temperature of the produced polyethylene.

It is another object of this invention to provide a process of polymerizing ethylene which produces highly crystalline polyethylene of high molecular weight and of higher density powder form.

It is still another object of this invention to provide a process of polymerizing ethylene without the use of a solvent which dissolves the produced polyethylene and requires complicated steps for separation and recovery thereof by employing carbon dioxide as the reaction medium.

Further, it is still another object of this invention to provide a process of polymerizing ethylene which produces continuously polyethylenes having the above-mentioned properties.

Other objects and advantages of this invention will become apparent from the detailed description hereinafter and the drawings.

BRIEF DESCRIPTION OF THE DRAWINGS

The sole figure shows an example of the apparatus used for the process of this invention.

DETAILED DESCRIPTION OF PREFERRED EMBODIMENTS

The invention will be illustrated by way of examples.

Example 1

The apparatus used is shown in the attached sole figure, in which the reference numbers refer to:

(1) Reservoir for starting materials
(2) Compressor
(3) Intermediate reservoir
(4) Tubular reactor
(5) Receptacle for polymerized product
(6) Flow meter
(7), (8) Valves
(9), (10) Pressure gauges Reservoir 1 is an ordinary cylinder for compressed gas. Compressor 2 is a diaphragm type pump. Intermediate reservoir 3 is a stainless steel 10 mm. thick vessel 100 ml. with a removable pressure-tight lid equipped with pressure gauge 9 (a Bourdon gauge). The tubular reactor is a 10 m. stainless pipe (3 mm. in inner diameter and 1.5 mm. in thickness) coiled into a helicoid about 30 cm. in diameter. Receptacle 5 is a stainless steel vessel 500 ml. in volume, with a wall 20 mm. thick, and a removable lid equipped with a Bourdon gauge 10. Flow meters are of the ordinary float type. The entire system is pressure-tight. The vessels 3, 4 and 5 are placed in a thermostat.

A mixture of ethylene and carbon dioxide (2:1 by weight) was stored in reservoir 1. The pressure of the mixture was 50 kg./cm.$^2$ at room temperature. One gram of diisopropyl-peroxy-dicarbonate diluted with the same amount of dioctyl phthalate was introduced into intermediate reservoir 3. All the members of the system were connected pressure tight and then the entire reaction system (except for the reservoir 1) was evacuated to $10^{-1}$ mm. Hg. for about 1 hour, whereupon the system was pressurized with the reactant up to 400 kg./cm.$^2$ by means of pump 2 while the intermediate reservoir was kept at 10° C. Evacuation and pressurization were repeated a few times.

As dioctyl phthalate is much heavier than the liquefied carbon dioxide and ethylene and is not miscible therewith, the mixture of diisopropyl-peroxy-dicarbonate and dioctyl phthalate remains at the bottom of intermediate reservoir 3 as a different liquid phase maintaining interfacial contact with the reactant phase as the latter continuously flows through the reservoir. Through this interfacial contact a small amount of the radical initiating compound is fed into the reactant all the time, and thus the polymerization reaction in the tubular reactor is sustained.

Then valve 8 was opened, and by regulating compressor 2 and opening of valve 8 a suitable flow rate was achieved. For each portion of the flow of the reactant (ethylene in carbon dioxide) to stay for about 15 minutes in the reaction zone, the linear flow rate had to be 0.7 m./min. Polymerized product was spontaneously precipitated and stored in receptable 5, and the unreacted ethylene and carbon dioxide were discharged through valve 8. The flow of the reactant was maintained for 6 hours while the reaction zone was kept at 50° C. and receptacle 5 was kept at about 5° C. The polymerized product was accumulated in the receiver without clogging of the pipe. The unreacted ethylene and carbon dioxide discharged from the receptacle was disposed in this experiment, but the discharged gas mixture may be replenished with the amount of monomeric ethylene corresponding to the amount of the polymerized ethylene and returned to the intermediate reservoir. Valve 7 was closed and the volatile reactant and medium were permitted to escape, and the polyethylene produced was collected and weighed. The amount of the polymer was 4.4 g. and its average molecular weight was 34,000.

Example 2

The apparatus used was the same as that used in Example 1 except that the inner diameter of the tubular reactor used was 6 mm. As a radical initiating compound, 0.5 g. of diisopropyl-peroxy-dicarbonate diluted with 0.5 g. of dibutyl phthalate was used, and the reaction zone was kept at 25-27° C., the intermediate reservoir at 2° C. The operation was quite the same as in Example 1.

After 3 hours flow, 1 gram of polyethylene of almost the same properties as the product of Example 1 was obtained.

Example 3

An experiment similar to Example 1 was carried out using azo-bis-isobutylonitrile as the radical initiating compound. This substance (0.2 g.) was diluted with 10 g. of 2-ethyl-hexyl adipate and was placed in the intermediate reservoir.

In this experiment, the reaction temperature was at 55° C. because this radical initiating compound is not easily decomposed to produce trigger radicals at lower temperatures. Therefore, the reactant mixture was in gaseous state in the reaction zone, and gaseous phase polymerization took place. In this case polyethylene was produced in powder form, too, and was entrained by the flow of the reactant to the receiver without the pipe line being clogged.

The reaction pressure was 400 kg./cm.$^2$. Linear velocity as gaseous phase was 1.0 m./min. After the reactant flowed for 4 hours, 3 grams of polyethylene was collected in the receiver.

The average molecular weight of the product was 70,000 and the density was 0.935 g./cc.

The ethylene to be used as the starting material should preferably be highly pure, containing less than 10 p.p.m. oxygen. However, ethylene supplied from a modern petrochemical plant, which is produced by decomposition of naphtha and is purified by the usual purifying steps annexed to the cracking system is satisfactory for use in the process of this invention.

The carbon dioxide to be used should preferably be of high purity. The most troublesome impurity is oxygen; oxygen content should preferably be less than 10 p.p.m. However, a low cost carbon dioxide that is produced by water gas reaction is satisfactory. The amount of carbon dioxide to be added to ethylene is 5–60 mol. percent, preferably 20–40 mol. percent of ethylene.

Radical initiating compound used in the method of this invention are benzoyl peroxide, azo-bis-isobutylonitrile, diisopropyl-peroxy-dicarbonate, di-tertiary-butyl peroxide, acetoxim and the like. These are known radical initiating compounds which are applicable to free radical reactions in general, including polymerization of ethylene. Since polymerization is carried out at a temperature lower than the melting range of the polyethylene produced, azo-bis-isobutylonitrile and diisopropyl-peroxy-dicarbonate are preferably used, because these compounds easily decompose at lower temperatures. Such selection of radical initiating compound is easily made by any person skilled in the art.

The diluent for the radical initiating compounds and which is placed in the intermediate reservoir must be immiscible with the mixture or ethylene and liquefied carbon dioxide and form a separate liquid phase. The liquid must preferably be much heavier than the reactant mixture, must also be stable against the used radical initiating compounds have no deleterious effect on the polyethylene products. From this viewpoint, high-boiling liquids used as plasticizer are generally suitable. Examples of such liquids are: di-n-octyl phthalate, diisooctyl phthalate, di-nonyl phthalate, butyl lauryl phthalats, 2-ethyl-hexyl adipate, 2-ethyl-hexyl sebacate and esters of epoxy alyphatic acids.

The usual reaction temperature employed is 20–200° C., preferably 20–90° C., at which temperature range advantages of this method are fully exhibited. When a radical initiating compounds which is not easily decomposed at lower temperatures is used, a reaction temperature above the critical temperature of carbon dioxide (310 C.) may have to be employed. In such a case, the reaction mixture remains in gaseous state in the reactor, and gaseous phase polymerization takes place. And by such gaseous phase polymerization, polyethylene is produced in powder form, too, and entrained by the flow of the reaction mixture to the product receptacle. The usual reaction pressure employed is 100–1000 atms.

As the temperature increases, the average molecular weight of the polymer produced decreases and the polymerization velocity decreases a little. As the pressure increases, polymerization velocity and average molecular weight of the produced polymer increases. However, a high-pressure apparatus is expensive. The reaction pressure will be determined by considering economic factors in apparatus design and operation.

The above-mentioned factors are considered in determining the residence time of the reactant in the reaction zone, in other words, the flow rate of the reactant. Such determination can be easily made by any person skilled in the art.

In the foregoing examples, ethylene, the starting material, and carbon dioxide, the reaction medium are preliminarily mixed and stored in the reservoir. But any person skilled in the art can construct an apparatus in which ethylene and carbon dioxide are stored in separate reservoirs, are mixed in the desired proportion by means of valves and flow meters, and pumps if necessary, and the mixture is fed into the intermediate reservoir and the reactor, and the mixture discharged from the product receptacle is replenished with an amount of ethylene which corresponds to the amount of polymerized ethylene and returned to the intermediate reservoir. An example of such as apparatus is described in the copending patent application Ser. No. 620,488 of this invention as well as selection of suitable radical copolymerization of ethylene and any other monomer, such as vinyl chloride, butadiene or carbon monoxide, which is homogeneously miscible with ethylene and liquefied carbon dioxide.

Various modifications are possible within the scope of this invention. A bigger pipe or a plurality of pipes can be employed as the reaction vessel. By basic experiments it was learned that a pipe the inner diameter of which is as much as 4 cm. can be used without any difficulty. Suitable diameter of the reaction pipe can be easily determined by any person skilled in the art by considering the amount of polyethylene to be produced and the above-mentioned various factors. It is needless to say, too, that instead of using said intermediate reservoir, we can use an injection apparatus which introduces a radical initiating compound into the reactor continuously in small doses.

What we claim is:

1. A process for preparing polyethylene in powder form, comprising polymerizing monomeric ethylene in carbon dioxide, the amount of carbon dioxide being no more than 60 mol percent of the ethylene, at a temperature lower than the melting point of the polyethylene to be produced, and in the presence of a solution of a radical initiating compound diluted in a solvent which is immiscible with the reaction mixture.

2. A process as set forth in claim 1, wherein the amount of carbon dioxide is at least 5 mol percent.

3. A process as set forth in claim 2, wherein the amount of carbon dioxide is 20–40 mol percent.

4. A process as set forth in claim 1 wherein the temperature is 20° C.–90° C.

5. A process as set forth in claim 1, wherein a stream of a mixture of the monomeric ethylene and liquefied carbon dioxide is continuously contacted interfacially with said solution, said mixture and the solvent forming separate liquid phases and a small amount of the radical initiating compound being continuously fed into the mixture, and the stream of the mixture containing the radical initiating compound is then passed through a tubular reactor.

6. A process as set forth in claim 1, in which the radical initiating compound is selected from a group consisting of benzoyl peroxide, azo-bis-isobutylonitrile, diisopropyl-peroxy-dicarbonate, di-tertiary butyl peroxide and acetoxim.

7. A process as as set forth in claim 1, in which the solvent is selected from a group consisting of di-n-octyl phthalate, diisoctyl phthalate, dinonylphthalate, butyl lauryl phthalate, di-2-ethylhexyl phthalate, di-2-ethylhexyl adipate, di-2-ethylhexyl sebacate, and esters of epoxy-aliphatic acids.

References Cited

UNITED STATES PATENTS

| | | | |
|---|---|---|---|
| 2,462,680 | 2/1949 | Sargent | 260—94.9 |
| 3,033,778 | 5/1962 | Frilette et al. | 260—94.9 |
| 3,069,404 | 12/1962 | Darby et al. | 260—94.9 |
| 3,090,778 | 5/1963 | Hampden et al. | 260—94.9 |
| 3,127,387 | 3/1964 | Ham et al. | 260—94.9 |
| 3,184,444 | 5/1965 | Eilbracht et al. | 260—94.9 |
| 3,198,780 | 8/1965 | Mortimer et al. | 200—94.9 |
| 3,232,922 | 2/1966 | Guillet et al. | 260—94.9 |
| 3,299,033 | 1/1967 | Douglas | 260—94.9 |
| 3,377,330 | 4/1968 | Mortimer et al. | 260—94.9 |

FOREIGN PATENTS

| | | |
|---|---|---|
| 835,121 | 5/1960 | Great Britain. |

SAMUEL H. BLECH, Primary Examiner

R. B. TURER, Assistant Examiner